US006242736B1

United States Patent
Honma et al.

(10) Patent No.: US 6,242,736 B1
(45) Date of Patent: Jun. 5, 2001

(54) SCANNING PROBE MICROSCOPE

(75) Inventors: Akihiko Honma; Takeshi Umemoto; Akira Inoue, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/116,319

(22) Filed: Jul. 15, 1998

(30) Foreign Application Priority Data

Jul. 16, 1997 (JP) .................................................. 9-191669
Jul. 16, 1997 (JP) .................................................. 9-191670
Jul. 7, 1998 (JP) ................................................ 10-191859

(51) Int. Cl.$^7$ ................................................ G01N 13/12
(52) U.S. Cl. .......................................... 250/306; 250/307
(58) Field of Search .................................. 250/306, 307, 250/423 F

(56) References Cited

U.S. PATENT DOCUMENTS

| 5,036,196 | * | 7/1991 | Hosaka et al. ........................ 250/306 |
| 5,376,790 | * | 12/1994 | Linker et al. .......................... 250/306 |
| 5,393,976 | * | 2/1995 | Koike et al. ........................... 250/310 |
| 5,877,497 | * | 3/1999 | Binnig et al. .......................... 250/306 |
| 5,983,713 | * | 11/1999 | Matsuzaki ............................. 250/306 |

* cited by examiner

Primary Examiner—Bruce C. Anderson
(74) Attorney, Agent, or Firm—Adams & Wilks

(57) ABSTRACT

A scanning probe microscope for scanning a probe needle in proximity to a surface of a sample in XY-axis directions while moving at least one of the probe and the sample in a Z-axis direction has a plurality of band-pass filters for passing a plurality of band-pass signals by extracting predetermined frequency bands different one another from a surface geometry signal output by a probe. An image memory stores the respective band-pass signals and corresponding positions on the sample surface, and a color image outputting device outputs a color image by treating each of the respective band-pass signals stored as image data in the image memory as different color data and combining the data. The plurality of band-pass signals includes a first band-pass signal having a first frequency range set to include only abrupt transitions in the sample surface and a second band-pass signal having a second frequency range set to include frequencies slightly outside the first frequency range so that abrupt transitions in geometry on the sample surface are represented by a first color in response to the first band-pass signal and areas directly adjacent the abrupt transitions on the sample surface are represented by a second color different from the first color.

31 Claims, 11 Drawing Sheets

SCANNING PROBE MICROSCOPE

BACKGROUND OF THE INVENTION

The present invention relates to a scanning probe microscope represented by a scanning interatomic force microscope (AFM: Atomic Force Microscope), and more particularly to a scanning probe microscope adapted to convert a surface geometry of a sample into color information depending on its surface frequency in order to effect color display.

The scanning probe microscope such as an AFM uses a cantilever provided with a probe needle at a tip of a cantilever beam in order to detect a microscopic texture or structure of a sample surface by utilizing an interaction between the sample surface and the probe.

The scanning of the probe needle utilizing such a cantilever over a sample surface causes an attractive force or a repulsive force between the sample surface and the probe needle on the basis of interatomic force. Consequently, if this interatomic force is detected as a cantilever strain amount and a sample stage is slightly moved in a Z direction so as to make this strain amount constant, that is, so as to make a gap between the sample surface and the probe needle constant, a slight-movement signal thereof or a detected strain amount itself will represent a geometry of the sample surface.

FIG. 13 is a block diagram showing one example of a signal processing system of a conventional scanning probe microscope. A sample 52 is rested on a three-dimensional sample stage 55, and above the sample 52 there is oppositely arranged a probe needle 54 fitted at a free end of a cantilever 53. The strain amount in the cantilever 53 is detected by measuring, using a position detector 73, an incident position of a laser beam 72 output by a laser generator 71.

The position detector 73 is constituted by a four-segment light detecting electrode, and aligned in position such that a spot of a laser beam 72 comes to a center of the four-divided electrode when the strain amount of the cantilever 53 is 0. Accordingly, if a strain occurs on the cantilever 53, the spot of a laser beam 72 moves over the four-segment electrode, thereby producing a difference in the voltage output by the four-segment electrode. This difference in voltage is amplified by a differential amplifier 74 and input as a strain signal S1 representative of a gap between the sample surface and the probe needle 54 to a non-inverted terminal (+) of a comparator 75. The comparator 75 has an inverted input terminal (−) to which a target value signal as to the strain amount in the cantilever 53 is input from a target value setting section 79.

An error signal S2 output by from the comparator 75 is input to a proportional integration (PI) control section 76. From the PI control section, a resultant signal of the error signal S2 and its integration value is input, as an observed image signal S3 and also as an actuator slight-movement signal for controlling the gap between the sample surface and the probe needle 54 to a predetermined value, to an amplifier 81 and an actuator driving amplifier 70.

A scan signal generating section 78 supplies a slight-movement signal for slightly moving the sample 52 in XY directions to the actuator driving amplifier 70. The position detector 73, the differential amplifier 74, the comparator 75, the PI control section 76 and the actuator drive amplifier 70 constitute a feedback circuit.

The observed image signal S3 is appropriately amplified by the amplifier 81 and thereafter supplied to an A/D converter 82 where it is converted into image data and stored in an image memory 83. An image memory control section 84 outputs an address signal and a lead signal to the image memory 83 in synchronism with a clock signal output by a synchronous signal generator 85. The image data output by the image memory 83 in response to the address signal and the lead signal is supplied to a RAM-DAC 86. The RAM-DAC 86 converts the image data into an analog signal in response to horizontal and vertical synchronizing signals, and the converted image data is output to a monitor unit 87.

Where a roughness of a sample surface is to be monochromatically displayed with accuracy, a gradation representation of approximately 16 bits is ideally required. The monitor unit 87, however, is low in gradation representability. In addition, the increase in gradation requires an increase in the resolving power of the A/D converter 82 or the memory capacity of the image memory 83, thereby resulting in expensive apparatus cost. To avoid this, the above-stated prior art apparatus is typically designed to represent each pixel concentration with 8 bits (64 gradations), so that there has been a problem that the sample surface roughness cannot be accurately represented.

In order to solve such problem, there has been proposed a method in which image data is put into a computer and the data is subjected to image processing so as to convert it into a three-dimensional representation. However, since the image data processing requires a high-speed processor and a large-capacity image memory, there has been the problem that the apparatus becomes expensive as well.

Further, in the above-stated prior art apparatus, if the space frequency as to the sample surface roughness is high, and the probe needle 1 is comparatively quick in scan speed, the probe needle 1 cannot follow the roughness as the case may be. Where the feedback circuit is insufficient in gain, the comparator 75 outputs an error signal S2 depending upon a difference between the strain signal S1 and the target value. The PI control section 76 outputs an observed image signal S3 as an actuator slight-movement signal in order to effect feedback control for approximating the error signal to zero. However, the error signal S2 cannot be reduced completely to zero. Consequently, the observed image signal S3 always becomes insufficient in signal component corresponding to the error signal S2, thereby resulting in bluntness at its edge portion.

In order to solve such problem, there has been a proposed structure, as in the prior art apparatus shown in FIG. 14, that is provided with a switching section 77 for selectively outputting either one of the strain signal S1 or an observed image signal S3 to the amplifying section 81 depending upon a switching signal separately input.

In the above-stated structure, however, the switching section 77 has to be switched to the strain signal S1 side when an edge portion is to be recognized with preference, while the switching section 77 switched to the observed image signal S3 side when a roughness state is to be recognized with preference. Due to this, there has been a problem in that an edge portion and a roughened portion are impossible to be recognized with accuracy at the same time.

It is an object of the present invention to provide a scanning probe microscope which is capable of converting a sample surface geometry into color information depending on its surface frequency to provide color display, thereby making it possible to accurately recognize the sample surface geometry.

SUMMARY OF THE INVENTION

In order to achieve the above-stated object, according to the present invention there is provided a scanning probe microscope adapted to scan a probe needle in proximity to a surface of a sample in XY-axis directions over the sample surface while moving at least one of the probe needle and the sample in the Z-axis direction, characterized by comprising: a signal generating means for outputting a surface geometry signal representative of a surface geometry of the sample on the basis of a change in gap spacing between the sample surface and the probe needle; a band-pass signal generating means for generating plural band-pass signals by extracting predetermined frequency bands different one another; an image memory for memorizing the respective band-pass signals by putting correspondence to positions on the sample surface; and a color image outputting means for outputting a color image by deeming that the respective image data memorized in the image memories is different-colored image data and combining these data.

With the above construction, since it is possible to color-display a surface geometry of a sample by converting it into color information in conformity to its space frequency, the surface geometry can be recognized easily and accurately.

DETAILED DESCRIPTION OF THE INVENTION

Figure 1:
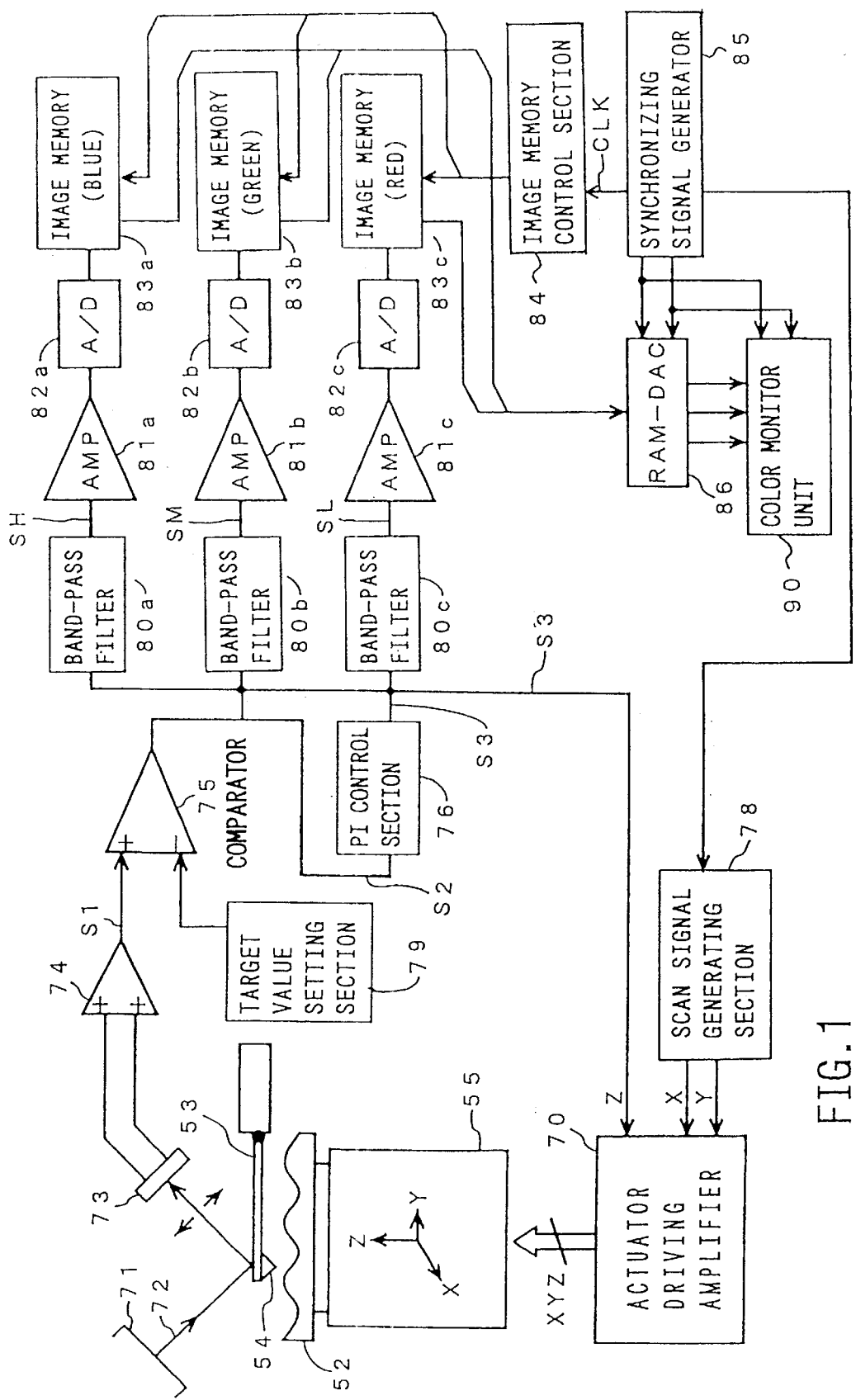
FIG. 1 is a block diagram of a signal processing system of a scanning probe microscope according to a first embodiment of the present invention.

The present invention will be explained in detail hereinbelow with reference to the drawings. FIG. 1 is a block diagram of a signal processing system of a scanning probe microscope according to a first embodiment of the present invention, wherein like reference characters denote the same or equivalent parts as those stated before.

Figure 2:
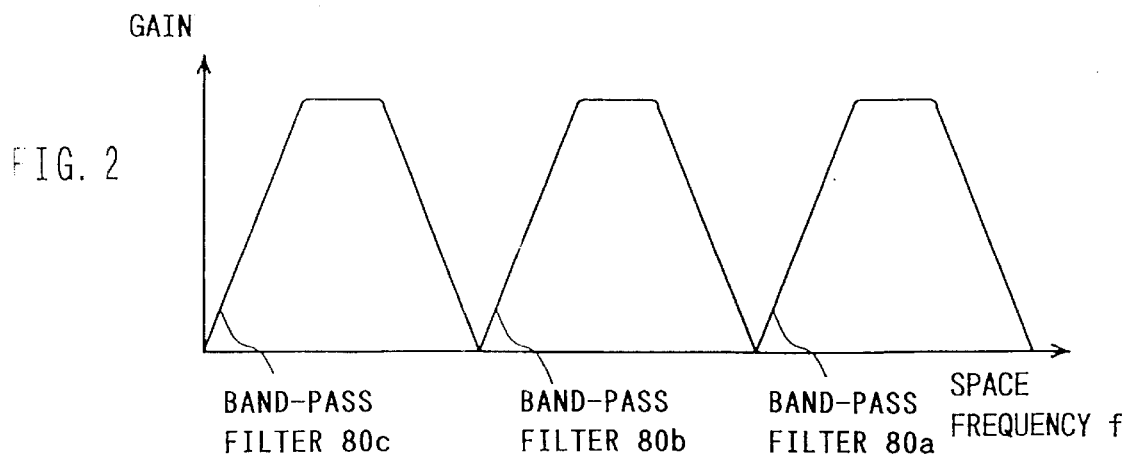
FIG. 2 is a diagram showing one (first) example of frequency characteristics of band-pass filters.

In the present embodiment, an observed image signal S3 output from a PI control section 76 is inputted as a surface geometric signal representative of a surface geometry of a sample 52 to band-pass filters 80a, 80b, 80c different in frequency characteristics therebetween. FIG. 2 is a diagram showing one example of frequency characteristic of the band-pass filters. The band-pass filter 80a removes an ultra-high range component which is a noise component, as well as intermediate and low range components of the observed image signal S3 to pass only a high-range component. The band-pass filter 80b removes the high and low range components from the observed image signal S3 to pass only the intermediate range component. The band-pass filter 80c removes the intermediate and high range components from the observed image signal S3 to pass only the low range component.

Figure 5:
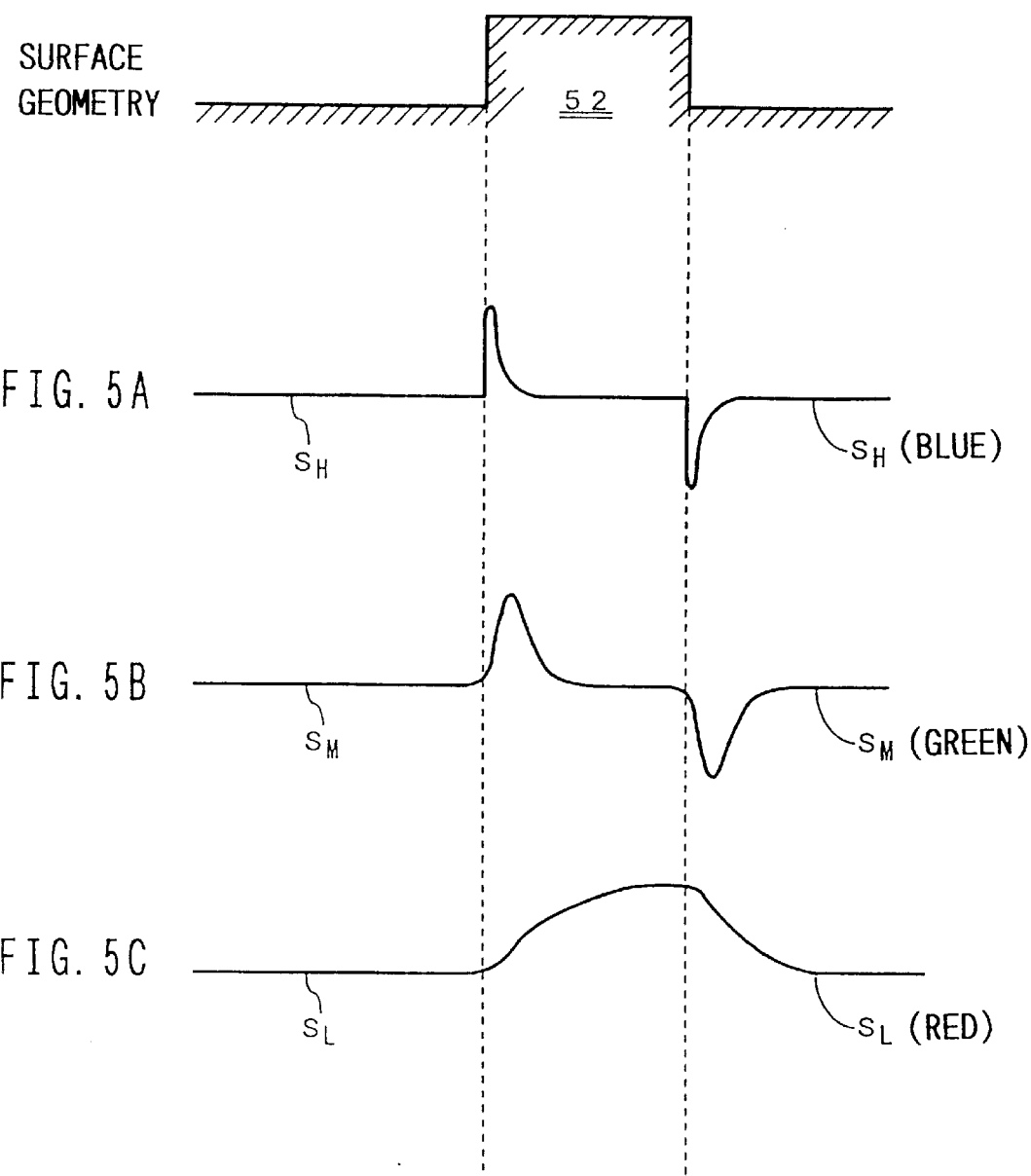
FIGS. 5A–5C are waveforms diagrams of band-pass signals in the event that the band-pass filters of FIG. 2 are used.

FIGS. 5A–5C are waveforms diagrams of band-pass signals passed through the respective band-pass filters. A band-pass signal SH passed through the band-pass filter 80a is a signal sharply varied at edge portions on a sample surface, as shown in FIG. 5A of the same figure. This band-pass signal SH is converted into a digital signal by an A/D converter 82a, and memorized in a corresponding address of an image memory 83a.

A band-pass signal SM passed through the band-pass filter 80b becomes a signal varying more moderately from the edge portion of the sample surface than the above case of FIG. 5A, as shown in FIG. 5B. This band-pass signal SM is converted into a digital signal by an A/D converter 82b, and memorized in an image memory 83b.

A band-pass signal SL passed through the band-pass filter 80c becomes a signal varying further more moderately from the edge portion of the sample surface than the above case of FIG. 5B, as shown in FIG. 5C. This band-pass signal SL is converted into a digital signal by an A/D converter 82c, and memorized in an image memory 83c.

An image memory control section 84 sequentially outputs, by a pixel unit, an address signal and a lead signal corresponding to a scan position of a cathode ray on a color monitor unit 90 to the respective image memories 83a–83c, in synchronism with a clock signal CLK output by a synchronous signal generator 85. The image data, read from the image memory 83a–83c in response to the address signal and the lead signal, is supplied to a RAM-DAC 86.

The RAM-DAC 86 converts the image data read from a corresponding address of the image memory 83a–83c into an analog signal, for each pixel position on the color monitor unit 90, on the basis of horizontal and vertical synchronous signals supplied from the synchronous signal generator 85, thereby outputting in a dot sequential system. The color monitor unit 90 has an RGB input terminal, so that the image data read from the image memory 83a is supplied as blue color image data to a B (blue) terminal of the RGB input terminal. Similarly, the image data read from the image memory 83b is supplied as green color image data to a G (green) input terminal of the RGB input terminal. Similarly, the image data read from the image memory 83c is supplied as red color image data to an R (red) input terminal of the RGB input terminal. The color monitor unit 90 composites the respective color image data to display a surface geometry of a sample with a color image represented in color depending upon the space frequency.

According to the present embodiment, since the surface geometry of a sample can be displayed in hue different depending upon its space frequency, an observer can accurately recognize a surface geometry. Further, in the present embodiment, particularly, the edge rise and fall points or the like forming abruptly concave or convex are displayed in blue according to the band-pass signal SH. The points adjacent the edge are displayed in green according to the band-pass signal SM. The other points are displayed in red according to the band-pass signal SL. In this manner, since inherent primary colors are displayed for each space frequency on the sample surface, it is possible to represent, with higher visibility, a roughened concave and convex state of the sample surface, i.e., represent a "waving" separately from a fine roughened state.

Figure 3:
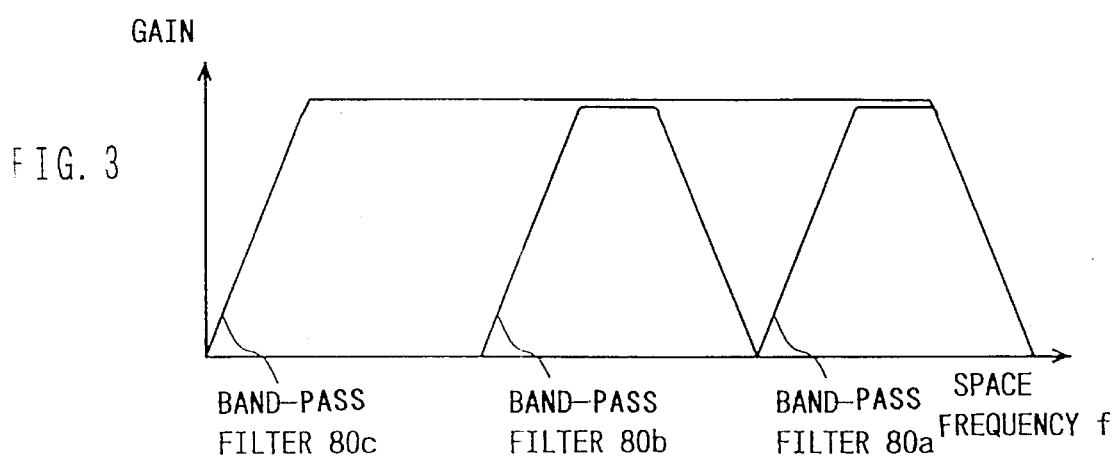
FIG. 3 is a diagram showing one (second) example of frequency characteristics of the band-pass filters.

FIG. 3 is a diagram showing another structural example of the above band-pass filters. A band-pass filter 80*a* allows only a high range component to pass by removing an ultra-high range component which is a noise component and intermediate and low range components from the observed image signal S3. A band-pass filter 80*b* allows only an intermediate range component to pass by removing a high range component and a low range component from the observed image signal S3. A band-pass filter 80*c* allows almost the entire range of signal components to pass by removing only the ultra-high range component from the observed image signal S3.

Figure 6:
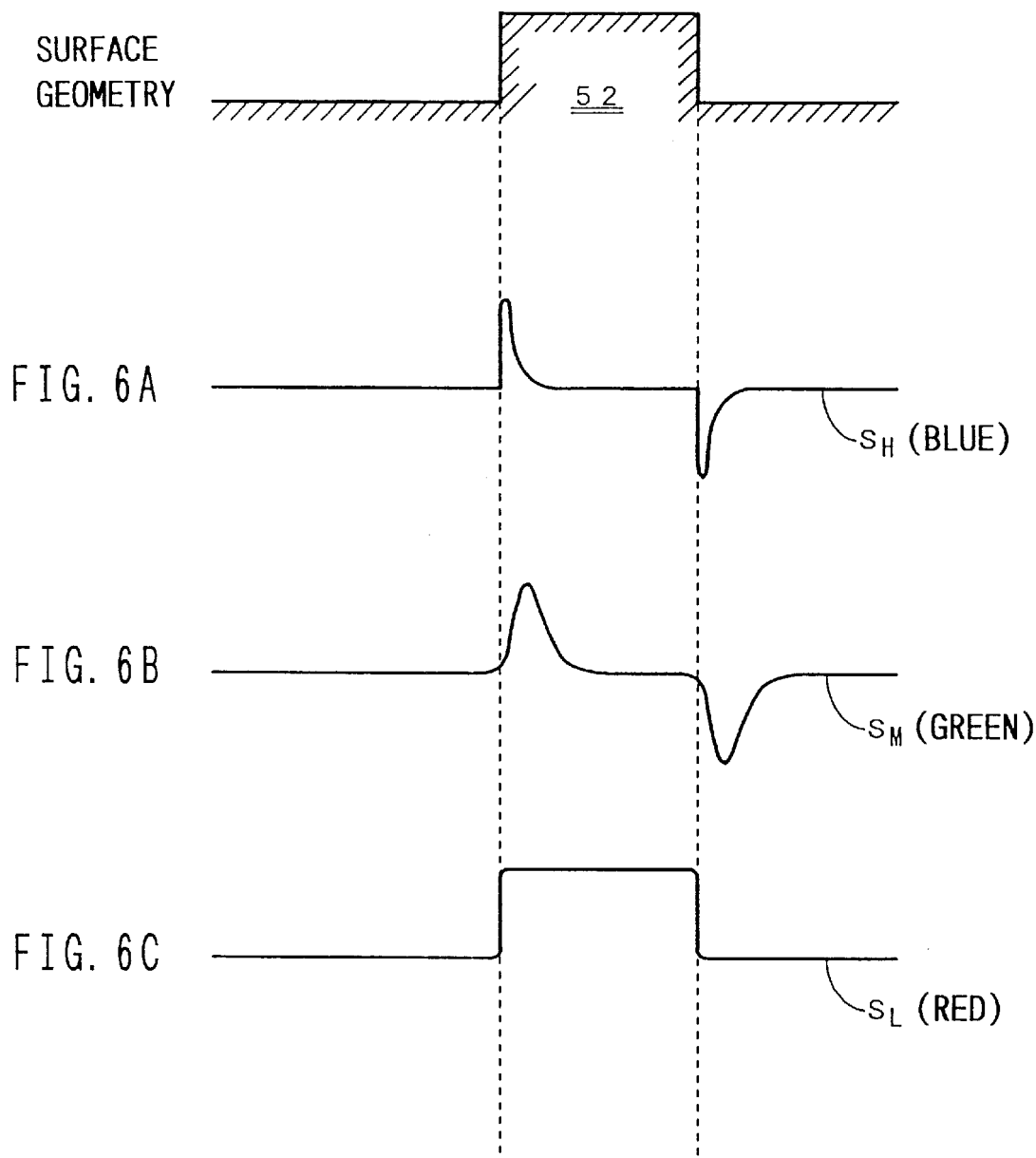
FIGS. 6A–6C are waveforms diagrams of band-pass signals in the event that the band-pass filters of FIG. 3 are used.

FIGS. 6A–6C are waveforms diagrams of the band-pass signals passed through the respective band-pass filters. The band-pass signal SH passed through the band-pass filter 80*a* becomes a signal abruptly varying at the edge portions on a sample surface, as shown in FIG. 6A. The band-pass signal SM passed through the band-pass filter 80*b* becomes a signal moderately varying from the edge portion on the sample surface, as shown in FIG. 6B. The band-pass signal SL passed through the band-pass filter 80*c* becomes a signal almost conforming to a surface geometry of the sample, as shown in FIG. 6C.

According to the present embodiment, the edge rise and fall portions or the like forming abruptly roughness are displayed in rose color by displaying a blue color according to the band-pass signal SH and a red color according to the band-pass signal SL superposed thereon. The portion adjacent the edge is displayed in yellow by superposing a green color according to the band-pass signal SM and a red color according to the band-pass signal SL. Other portions are displayed in red according to the band-pass signal SL.

In this manner, in the present embodiment the displayed color is gradually varied depending on a distance from the edge portion. A planar portion distant from the edge has a red color varying in concentration depending on a height of the sample surface. Accordingly, the height in a roughened portion on the sample surface can be represented in a manner easy to recognize.

Figure 4:
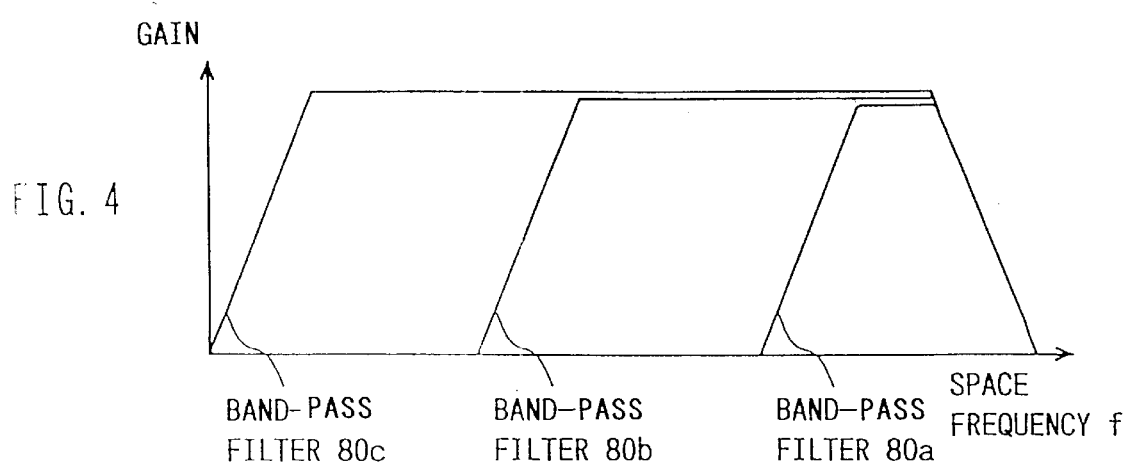
FIG. 4 is a diagram showing one (third) example of frequency characteristics of the band-pass filters.

FIG. 4 is a diagram showing another structural example of the band-pass filters. The band-pass filter 80*a* removes ultra-high range component and intermediate and low range components from the observed image signal S3 to pass only a high range component. The band-pass filter 80*b* removes a low range component from the observed image signal S3 to pass only intermediate and high range components. The band-pass filter 80*c* removes only a ultra-high range component from the observed image signal S3 to pass almost the entire range of the signal components.

Figure 7:
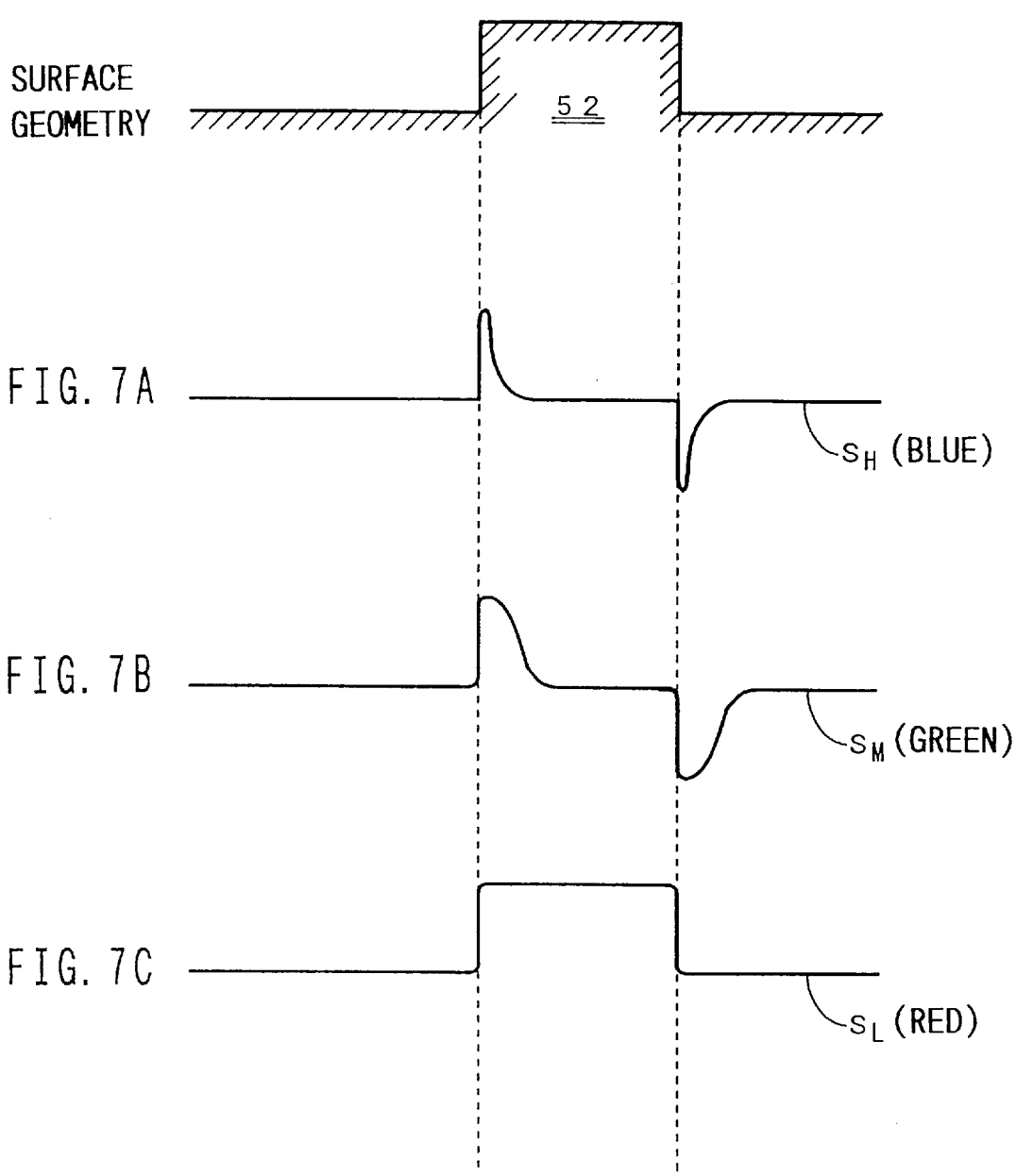
FIGS. 7A–7C are waveforms diagrams of band-pass signals in the event that the band-pass filters of FIG. 4 are used.

FIGS. 7A–7C are waveforms diagrams of the band-pass signals passed through the respective band-pass filters. The bandpass signal SH passed through the band-pass filter 80*a* becomes a signal abruptly varying at the edge portions on a sample surface, as shown in FIG. 7A of the same figure. The band-pass signal SM passed through the band-pass filter 80*b* becomes a signal abruptly varying at the edge portion on the sample surface and then comparatively moderately varying, as shown in FIG. 7B. The band-pass signal SL passed through the band-pass filter 80*c* becomes a signal almost conforming to a surface geometry of the sample, as shown in FIG. 7C.

According to the present embodiment, the edge rise and fall portions forming abruptly roughness or the like are displayed in white by superposedly displaying the colors according to the band-pass signals SH, SM, SL. The portion adjacent the edge is displayed in yellow by displaying a green color according to the band-pass signal SM and a red color according to the band-pass signal SL superposed thereon. The other portions become red according to the band-pass signal SL.

In this manner, in the present embodiment the display color gradually varies from white to green and to red depending upon a distance from the edge portion. This functions as a shadow to enable three-dimensional displays.

Figure 8:
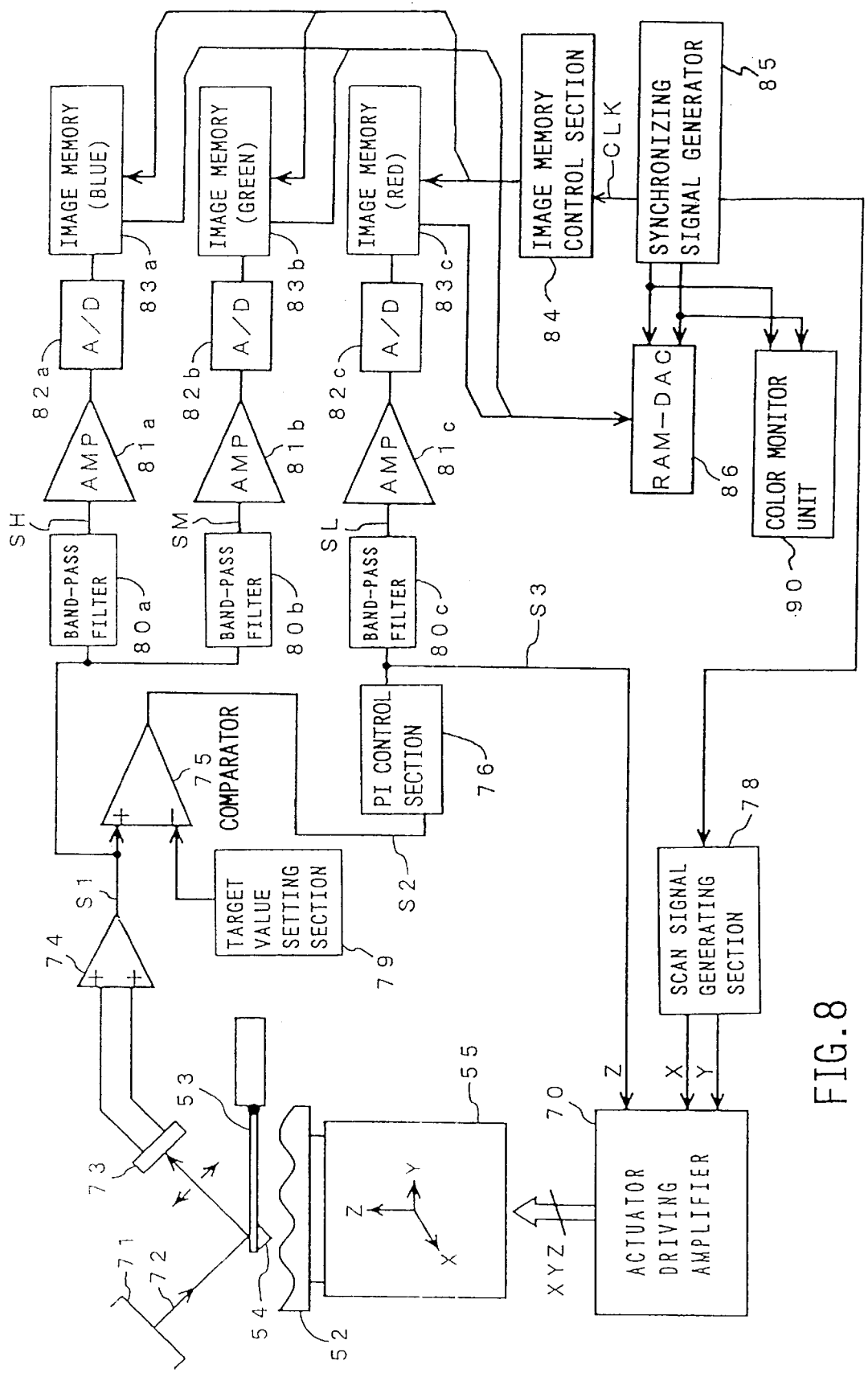
FIG. 8 is a block diagram of a signal processing system of a scanning probe microscope according to a second embodiment of the present invention.

FIG. 8 is a block diagram of a signal processing system of a scanning probe microscope according to a second embodiment of the present invention, wherein the same reference numerals as those stated before denote same or equivalent parts.

In the present embodiment, a strain signal S1 output by a differential amplifier 74 is input to a non-inverted input terminal (+) of a comparator, and directly input as a surface geometric signal representative of a surface geometry of a sample to band-pass filters 80*a* and 80*b*. To a band-pass filter 80*c*, an observed image signal S3 output by a PI control section 76 is input as a surface geometric signal.

Figure 10:
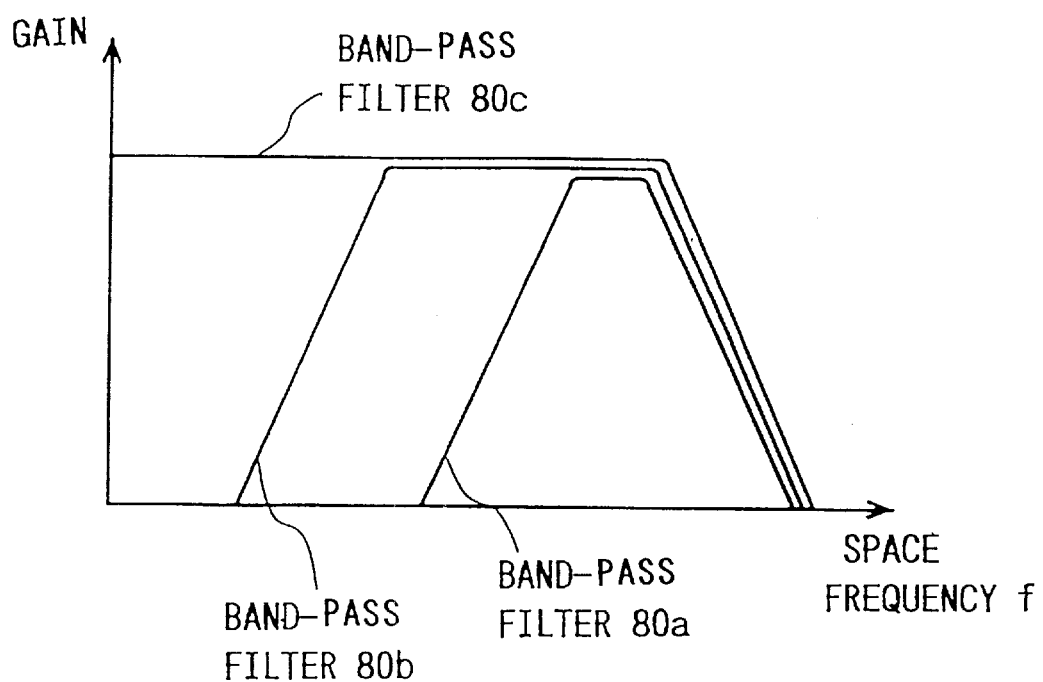
FIG. 10 is a diagram showing one (fourth) example of frequency characteristics of the band-pass filters.

FIG. 10 is a diagram showing frequency characteristics of band-pass filters. The band-pass filter 80*a* removes an ultra-high range component which is a noise component and an intermediate range component from the strain signal S1 to pass only a high range component. The band-pass filter 80*b* removes a ultra-high range component and a low range component from the strain signal S1 to pass a high range component and an intermediate range component. The band-pass filter 80*c* removes an ultra-high range component from an actuator driving signal S3 to pass almost entire range of the almost signal components.

Figure 12:
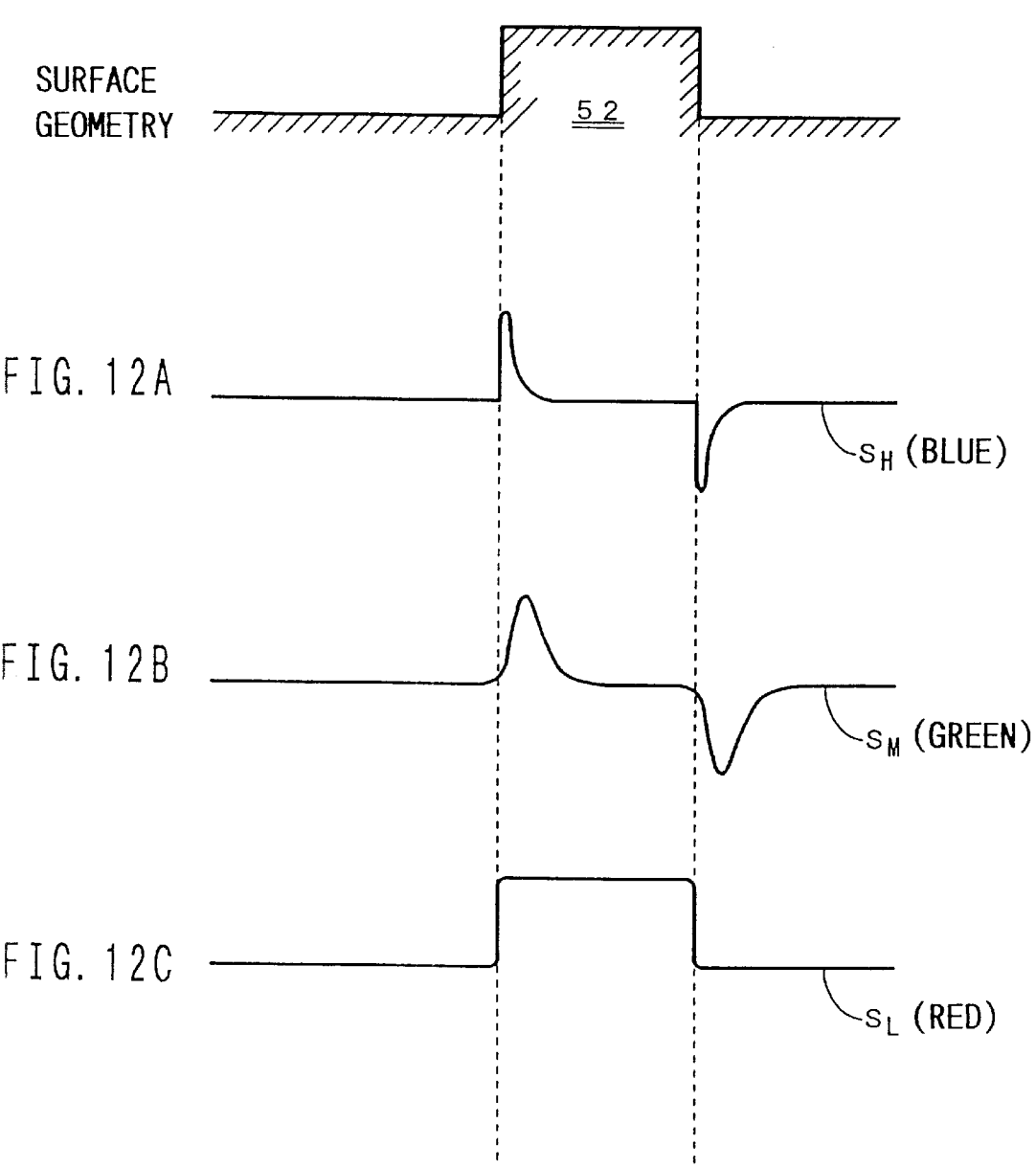
FIGS. 12A–12C are waveforms diagrams of band-pass signals in the event that the band-pass filters of FIG. 11 are used.
Figure 13:
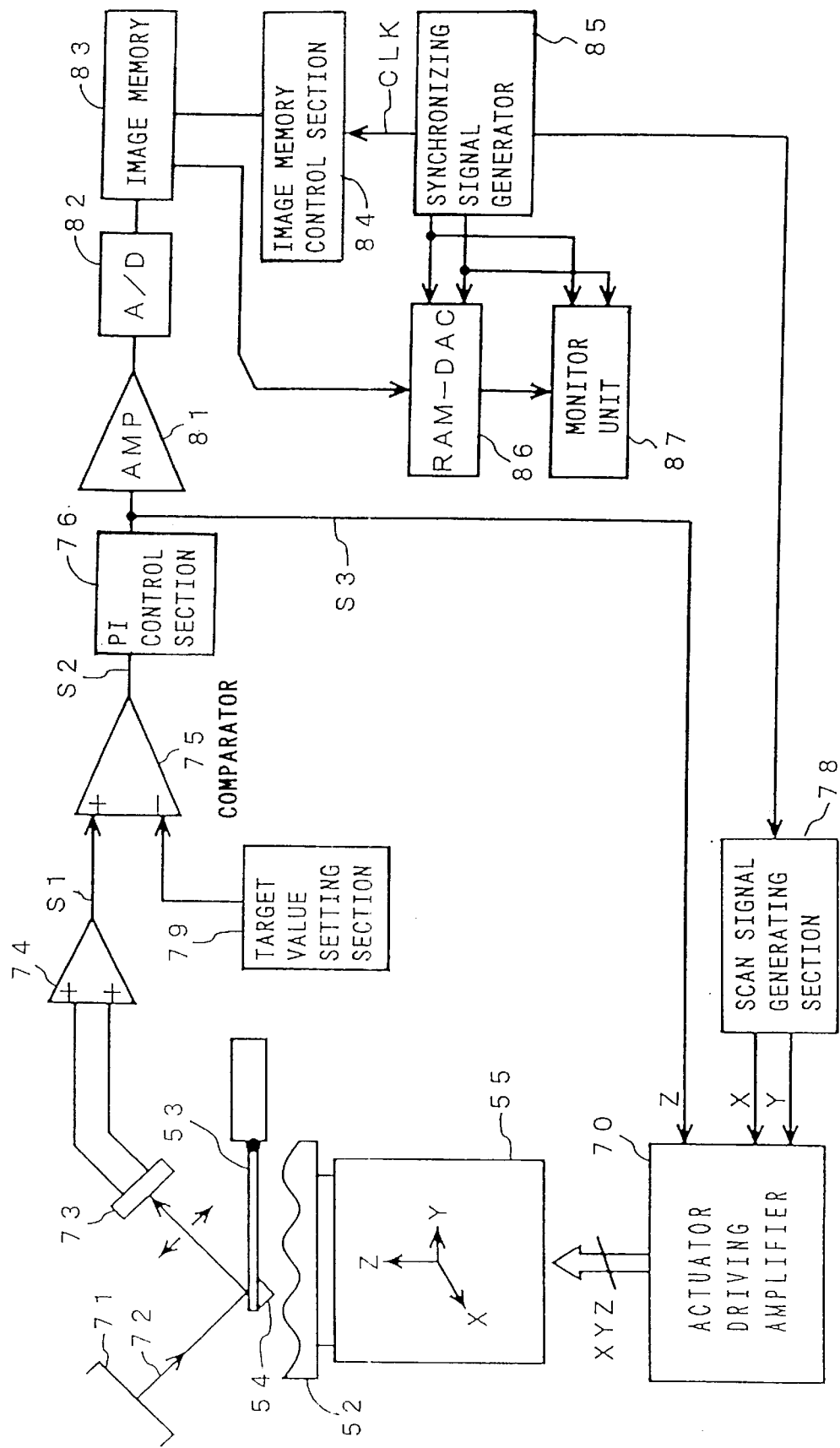
FIG. 13 is a block diagram of a signal processing system of a scanning probe microscope of an prior art.
Figure 14:
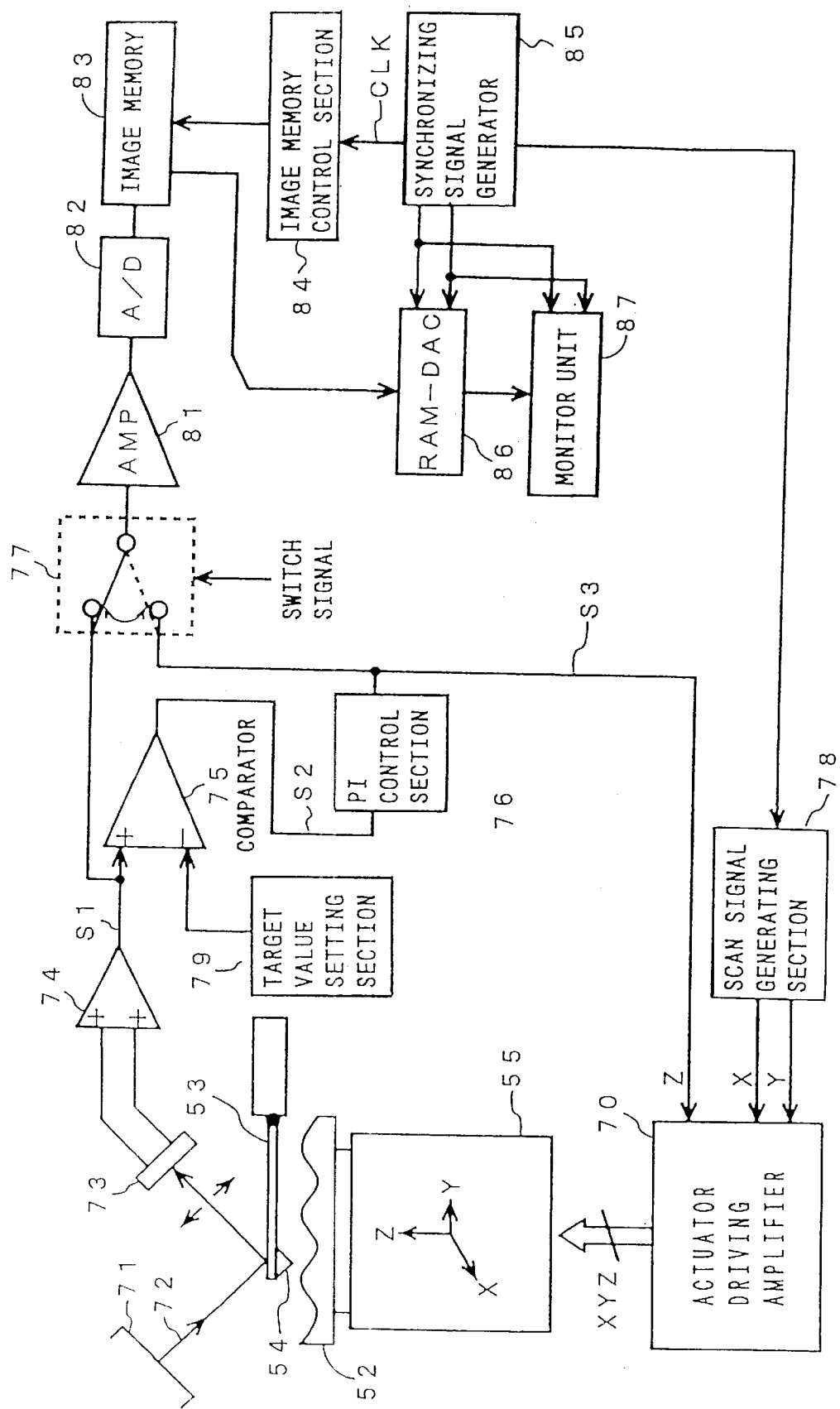
FIG. 14 is a block diagram of a signal processing system of a scanning probe microscope of an prior art.

FIGS. 12A–12C are waveforms diagrams of the band-pass signals passed through the respective band-pass filters. A band-pass signal SH passed through the band-pass filter 80*a* becomes a signal abruptly varying at the edge portions on a sample surface, as shown in FIG. 12A of the same figure. This band-pass signal SH is converted into a digital signal by an A/D converter 82*a* and memorized in a corresponding address of an image memory 83*a*. A band-pass signal SM passed through the band-pass filter 80*b* becomes a signal moderately varying at the edge portion on the sample surface, as shown in FIG. 12B. This band-pass signal SM is converted into a digital signal by an A/D converter 82*b* and memorized in an image memory 83*b*. A band-pass signal SL passed through the band-pass filter 80*c* becomes a signal corresponding to a surface geometry of the sample, as shown in FIG. 12C of the same figure. This band-pass signal SL is converted into a digital signal by an A/D converter 83*c* and memorized in an image memory 83*c*.

According to the present embodiment, the surface geometry of a sample can be displayed in hue different depending on its space frequency. For example, the edge portion forming abruptly roughness or the like is displayed in white by superposing all the color image data (band-pass signals), thereby enabling contour emphasis. Further, the concave portion and the convex portion are different in intensity of the band-pass signal SL and hence in color concentration as shown in FIG. 12C, so that both are easily to distinguished. Furthermore, a portion adjacent the edge gradually varies in display color from white to green and to red. Since this functions as a shadow, a three-dimensional display becomes possible.

Figure 9:
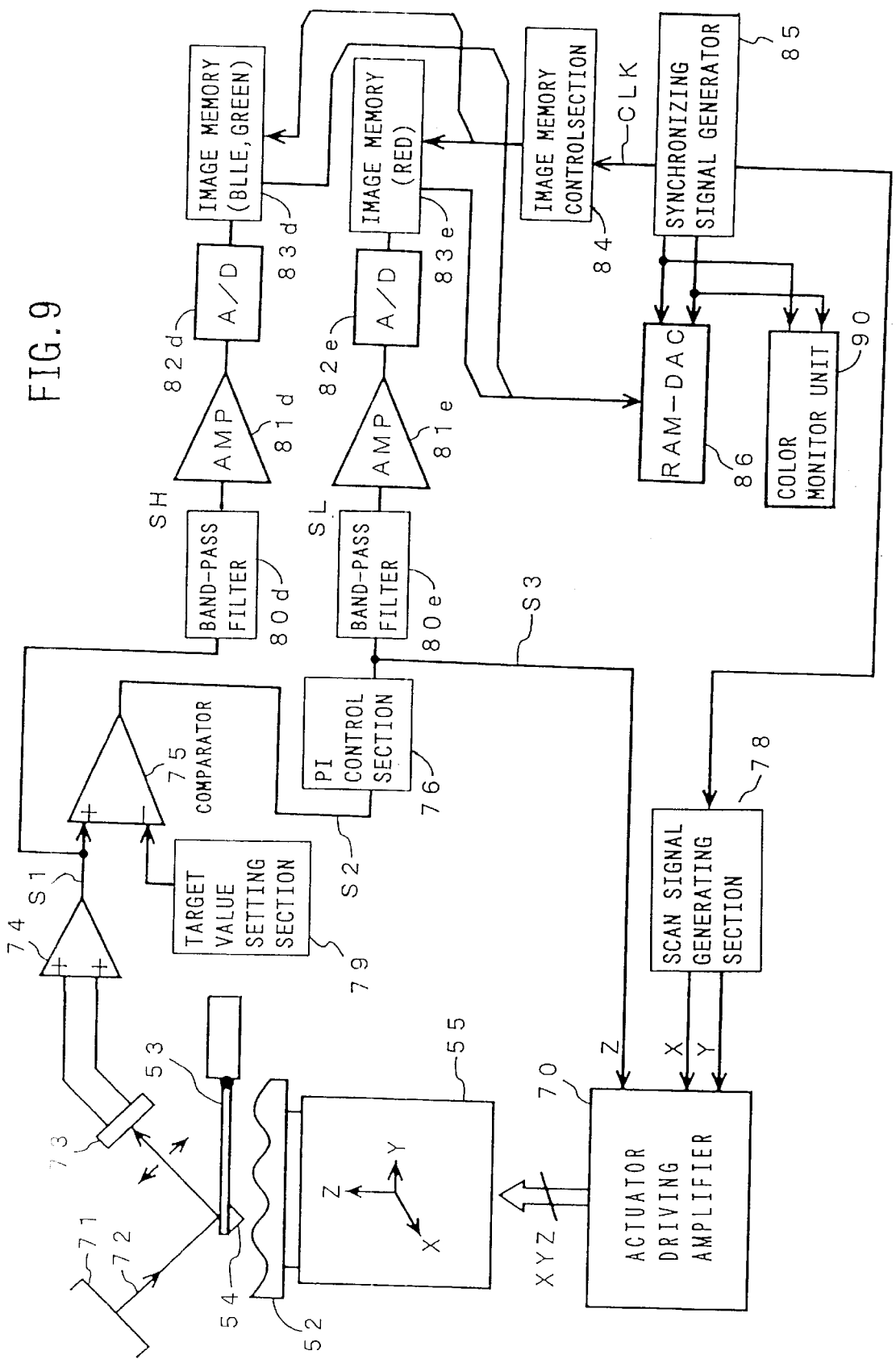
FIG. 9 is a block diagram of a signal processing system of a scanning probe microscope according to a third embodiment of the present invention.

FIG. 9 is a block diagram of a signal processing system of a scanning probe microscope according to a third embodiment of the present invention, wherein the same reference numerals as those stated before denote the same or equivalent parts.

In the present embodiment, a strain signal S1 output by a differential amplifier 74 is directly input to a band-pass filter 80d, while an observed image signal S3 output by a PI control section 76 is input to a band-pass filter 80e.

Figure 11:
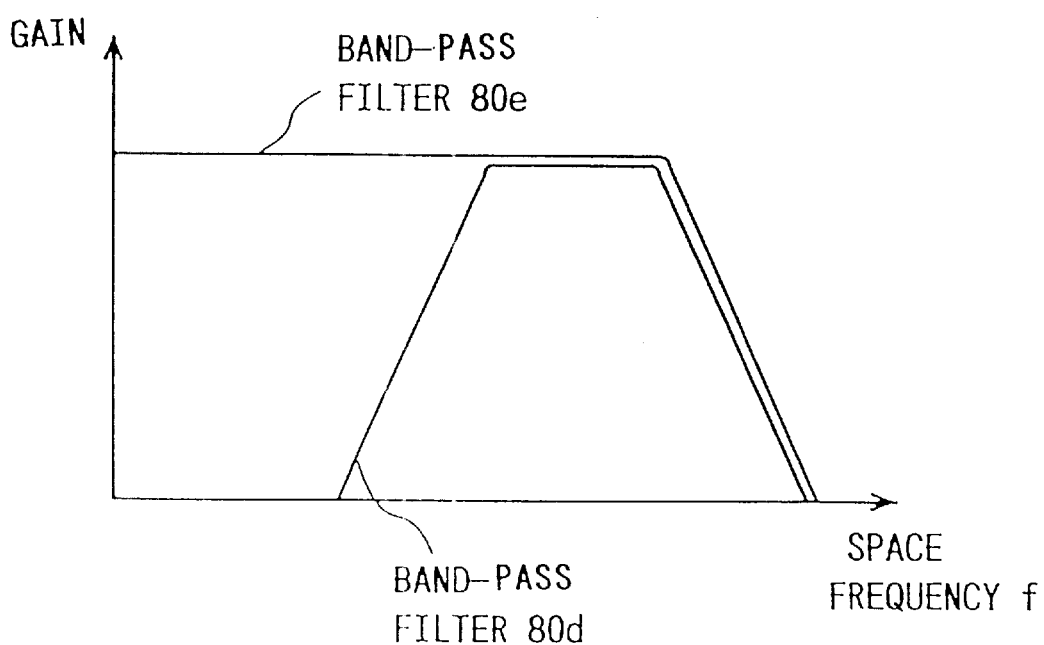
FIG. 11 is a diagram showing one (fifth) example of frequency characteristics of the band-pass filters.

FIG. 11 is a diagram showing frequency characteristics of the respective band-pass filters. The band-pass filter 80d removes an ultra-high range component which is a noise component and a low range component to pass only an intermediate range component. The band-pass filter 80e removes only an ultra-high range component to pass almost the entire range of the signal components.

A band-pass signal SH passed through the band-pass filter 80d is converted into a digital signal by an A/D converter 82d, and memorized in a corresponding address of an image memory 83d. Similarly, a band-pass signal SL passed through the band-pass filter 80e is converted into a digital signal by an A/D converter 82e, and memorized in an image memory 83e.

An image memory control section 84 sequentially outputs an address signal and a lead signal corresponding to a scan position on the color monitor unit 90 to the respective image memories 83d, 83e, in synchronism with a clock signal CLK output by a synchronous signal generator 85. The image data, read from the image memory 83d, 83e in response to the address signal and the lead signal, is supplied to a RAM-DAC 86.

The RAM-DAC 86 converts the image data read from a corresponding address of the image memory 83d, 83e into an analog signal, for each pixel position on the color monitor unit 90, on the basis of horizontal and vertical synchronous signals supplied from the synchronous signal generator 85, thereby outputting in a dot sequential system. The image data read from the image memory 83d is supplied as blue color image data and green color image data respectively to a B (blue) terminal of and a G (green) terminal of the RGB input terminal of the color monitor unit 90. The image data read from the image memory 83d is supplied as red color image data to a R (red) terminal of the RGB input terminal.

Also in the present embodiment, the surface geometry of a sample surface can be displayed in hue different depending upon its space frequency. The edge portion forming abruptly roughness or the like is displayed in white by superposing all the color image data, thereby enabling contour emphasis. Further, the concave portion and the convex portion are different in intensity of the band-pass signal SL and hence in the color concentration, so that both are easily distinguished.

In each of the above-described embodiments, it was explained that the image memory control section 84 sequentially outputs an address signal and a lead signal corresponding to a scan position of a cathode ray on the color monitor unit 90 wherein from the RAM-DAC 86 to the color monitor unit 90 there are supplied, in a dot sequential system, color image data read from the respective image memories. However, the present invention is not limited only to this structure. The image memory control section 84 may sequentially output, by a frame unit of the color monitor unit 90, an address signal and a lead signal to the respective image memories, and from the RAM-DAC 86 to the color monitor unit 90 each image data may be supplied by a frame sequential (plane sequential) system.

Further, in each of the above-described embodiments, it was explained to the effect that the image data memorized depending on the frequency band by the respective image memories are considered as being color image data in primary colors (R, G, B) different respectively, so that an observation image of a sample surface is displayed in a color depending upon its space frequency. However, the present invention is not limited only to this structure. The image data memorized in the respective image memories may be considered as being image data that are different in color property, so long as they can be visually distinguished.

For example, if hue, chroma and brightness are adopted as color properties in place of R, G, B, the image data in a frequency band assigned, for example, with hues are displayed in different hue depending upon a value on each pixel. The image data in a frequency band assigned with chroma are displayed by differing a white mixing ratio depending upon a value thereof. The image data in a frequency band assigned with brightnesses are displayed by differing a white mixing ratio depending upon a value thereof.

As described above, the following effects are achieved by the preset invention.

(1) Since a surface geometry of a sample can be displayed in hue different depending on its space frequency, the surface geometry can be recognized easily and accurately.

(2) If the space frequency of the sample surface is appropriately corresponded to a display color inherent to the space frequency, it is possible to represent, with higher visibility, a roughened concave and convex state of the sample surface, i.e., represent a "waving" separately from a fine roughened state.

(3) The property of display color gradually varies depending upon a distance from an edge portion. At a flattened position distant from the edge portion, the property of color varies depending on a height at a sample surface. Accordingly, the height of roughened portion on the sample surface can be represented with visibility.

(4) At the edge portion forming abruptly roughness or the like, all the color image data are superposed for display, so that the display color is in white enabling contour emphasis.

(5) Since the concave and convex portions on the sample surface are different in color concentration, both can be easily distinguished.

(6) At a portion close to the edge, the display color gradually varies depending upon the distance from the edge, so that this functions as shadow, thereby enabling three-dimensional display.

What is claimed is:

1. A scanning probe microscope for scanning a probe needle in proximity to a surface of a sample in XY-axis directions over the sample surface while moving at least one of the probe and the sample in a Z-axis direction, comprising:

signal generating means for generating and outputting a surface geometry signal representative of a surface geometry of the sample on the basis of a change in a gap between the sample surface and the probe needle as the probe needle is undergoing relative scanning movement across the sample surface in the XY-axis directions;

band-pass signal creating means for creating plural band-pass signals by extracting predetermined frequency bands different from one another from the surface geometry signal and outputting the band-pass signals;

an image memory for storing the respective band-pass signals and corresponding positions on the sample surface; and color image outputting means for outputting a color image by treating each of the respective band-pass signals stored as image data in the image memory as different color image data and combining the data;

wherein the plural band-pass signals include a first band-pass signal having a first frequency range set to include only abrupt transitions in the sample surface and a second band-pass signal having a second frequency range set to include frequencies slightly outside the first frequency range so that abrupt transitions in geometry on the sample surface are represented by a first color in response to the first band-pass signal and areas directly adjacent the abrupt transitions on the sample surface are represented by a second color different from the first color.

2. A scanning probe microscope according to claim 1; wherein the signal generating means includes means for monitoring strain of the probe as the probe needle undergoes relative movement in the XY-axis directions with respect to the sample surface and outputting as the surface geometry signal a strain signal representative of the gap between the sample surface and the probe needle.

3. A scanning probe microscope according to claim 2; wherein the band-pass signal creating means creates a first band-pass signal comprising a high range frequency component of the surface geometry signal, a second band-pass signal comprising an intermediate range frequency component of the surface geometry signal, and a third band-pass signal comprising a low range frequency component of the surface geometry signal.

4. A scanning probe microscope according to claim 3; wherein the color image outputting means includes means for determining that the first band-pass signal is color image data of a first color, the second band-pass signal is color image data of a second color, and the third band-pass signal is color image data of a third color.

5. A scanning probe microscope according to claim 4; wherein the first to third colors are each a different one of red, blue and green.

6. A scanning probe microscope according to claim 2; wherein the band-pass signal creating means creates a first band-pass signal comprising a high range frequency component of the surface geometry signal, a second band-pass signal comprising an intermediate range frequency component of the surface geometry signal, and a third band-pass signal comprising low, intermediate and high range frequency components of the surface geometry signal.

7. A scanning probe microscope according to claim 2; wherein the band-pass signal creating means creates a first band-pass signal comprising a high range frequency component of the surface geometry signal, a second band-pass signal comprising intermediate and high range frequency components of the surface geometry signal, and a third band-pass signal comprising low, intermediate and high range frequency components of the surface geometry signal.

8. A scanning probe microscope according to claim 1; wherein the signal generating means outputs a strain signal representative of a gap between the sample surface and the probe needle and a feedback control signal for maintaining the gap between the sample surface and the probe needle at a predetermined value respectively as first and second surface geometry signals.

9. A scanning probe microscope according to claim 8; wherein the band-pass signal creating means creates a first band-pass signal comprising a high range frequency component of the first surface geometry signal, a second band-pass signal comprising intermediate and high range frequency components of the first surface geometry signal, and a third band-pass signal comprising low, intermediate and high range frequency components of the second surface geometry signal.

10. A scanning probe microscope according to claim 9; wherein the color image outputting means includes means for determining that the first band-pass signal is color image data of a first color, the second band-pass signal is color image data of a second color, and the third band-pass signal is color image data of a third color.

11. A scanning probe microscope according to claim 8; wherein the band-pass signal creating means creates a third band-pass signal comprising intermediate and high range frequency components of the first surface geometry signal, and a fourth band-pass signal comprising low, intermediate and high range frequency components of the second surface geometry signal.

12. A scanning probe microscope according to claim 11; wherein the color image outputting means includes means for determining that the fourth band-pass signal is color image data of first and second colors, and the fifth band-pass signal is color image data of a third color.

13. A scanning probe microscope according to claim 1; wherein the band-pass signal creating means further creates a third band-pass signal having a frequency range outside that the first and second frequency ranges, so that areas on the sample surface further from the abrupt transitions than those directly adjacent thereto are represented by a third color different from the first and second colors.

14. A scanning probe microscope according to claim 13; wherein the first, second and third frequency ranges do not overlap.

15. A scanning probe microscope according to claim 13; wherein the third frequency range overlaps the first and second frequency ranges.

16. A scanning probe microscope according to claim 13; wherein the third frequency range overlaps the first and second frequency ranges and further includes frequencies lower than the first and second frequency ranges.

17. A scanning probe microscope according to claim 13; wherein the second and third frequency ranges overlap the first frequency range.

18. A scanning probe microscope according to claim 13; wherein the second and third frequency ranges overlap the first frequency range and further includes frequencies lower than the first frequency range.

19. A scanning probe microscope according to claim 13; wherein the third frequency range overlaps the first and second frequency ranges and further includes frequencies lower than the first and second frequency ranges, so that abrupt transitions in the sample surface are represented by a combination of the first and third colors, areas directly adjacent the abrupt transitions are represented by the second color, and other areas of the sample surface are represented by the third color.

20. A scanning probe microscope according to claim 13; wherein the second and third frequency ranges overlap the first frequency range and further include frequencies lower than the first frequency range, so that abrupt transitions in the sample surface are represented by a combination of the first, second and third colors, areas directly adjacent the abrupt transitions are represented by the second and third colors, and other areas of the sample surface are represented by the third color.

21. A scanning probe microscope according to claim 13; wherein cutoff frequencies of the band-pass signals are set so that concave and convex regions of the sample surface are represented in at least one of a different color from each other and a different intensity of the same color.

22. A scanning probe microscope according to claim 1; wherein the first and second frequency ranges do not overlap.

23. A scanning probe microscope according to claim 1; wherein the first and second frequency ranges overlap and the second frequency range further includes frequencies below that of the first frequency range.

24. A scanning probe microscope according to claim 1; wherein cutoff frequencies of the band-pass signals are set so that concave and convex regions of the sample surface are represented in at least one of a different color from each other and a different intensity of the same color.

25. A scanning probe microscope according to claim 1; wherein the band-pass signal creating means comprises a plurality of band-pass filters each for extracting a predetermined frequency band different from one another from the surface geometry signal and outputting a respective band-pass signal.

26. A scanning probe microscope for scanning a probe needle in proximity to a surface of a sample in XY-axis directions over the sample surface while moving at least one of the probe and the sample in a Z-axis direction, comprising:

signal generating means for generating and outputting a surface geometry signal representative of a surface geometry of the sample on the basis of a change in a gap in the Z-axis direction between the sample surface and the probe needle as the probe needle is undergoing relative scanning movement across the sample surface in the XY-axis directions;

band-pass signal creating means for creating plural band-pass signals by extracting predetermined frequency bands different from one another from the surface geometry signal and outputting the band-pass signals;

an image memory for storing the respective band-pass signals as image data along with corresponding positions on the sample surface; and color image outputting means for outputting a color image by treating each of the respective band-pass signals stored as image data in the image memory as different color image data and combining the data;

wherein the signal generating means outputs a strain signal representative of a gap between the sample surface and the probe needle and a feedback control signal for maintaining the gap between the sample surface and the probe needle at a predetermined value respectively as first and second surface geometry signals; and wherein the band-pass signal creating means creates a first band-pass signal comprising intermediate and high range frequency components of the first surface geometry signal, and a second band-pass signal comprising low, intermediate and high range frequency components of the second surface geometry signal.

27. A scanning probe microscope according to claim 26; wherein the color image outputting means includes means for determining that the first band-pass signal is color image data of first and second colors, and the second band-pass signal is color image data of a third color.

28. A scanning probe microscope for scanning a probe needle in proximity to a surface of a sample in XY-axis directions over the sample surface while moving at least one of the probe and the sample in a Z-axis direction, comprising:

signal generating means for generating and outputting a surface geometry signal representative of a surface geometry of the sample on the basis of a change in a gap between the sample surface and the probe needle as the probe needle is undergoing relative scanning movement across the sample surface in the XY-axis directions;

band-pass signal creating means for creating a first band-pass signal comprising a high frequency range component of the surface geometry signal, a second band-pass signal comprising an intermediate frequency range component of the surface geometry signal, and a third band-pass signal comprising low, intermediate and high frequency range components of the surface geometry signal;

an image memory for storing the respective band-pass signals and corresponding positions on the sample surface; and color image outputting means for outputting a color image by treating each of the respective band-pass signals stored as image data in the image memory as different color data and combining the data.

29. A scanning probe microscope according to claim 28; wherein the signal generating means includes means for outputting as the surface geometry signal a strain signal representative of the gap between the sample surface and the probe needle.

30. A scanning probe microscope for scanning a probe needle in proximity to a surface of a sample in XY-axis directions over the sample surface while moving at least one of the probe and the sample in a Z-axis direction, comprising signal generating means for generating and outputting a surface geometry signal representative of a surface geometry of the sample on the basis of a change in gap between the sample surface and the probe needle as the probe needle is undergoing relative scanning movement across the sample surface in the XY-axis directions;

band-pass signal creating means for creating a first band-pass signal comprising a high frequency range component of the surface geometry signal, a second band-pass signal comprising intermediate and high frequency range components of the surface geometry signal, and a third band-pass signal comprising low, intermediate and high frequency range components of the surface geometry signal;

an image memory for storing the respective band-pass signals and corresponding positions on the sample surface; and color image outputting means for outputting a color image by treating each of the respective band-pass signals stored as image data in the image memory as different color data and combining the data.

31. A scanning probe microscope according to claim 30; wherein the signal generating means includes means for outputting as the surface geometry signal a strain signal representative of the gap between the sample surface and the probe needle.

* * * * *